May 28, 1968  B. M. HARGIS  3,385,618
CERAMIC-TO-METAL SEAL
Filed May 26, 1965

INVENTOR.
BILLY M. HARGIS
BY
Carpenter, Kinney & Coulter
ATTORNEYS

United States Patent Office 3,385,618
Patented May 28, 1968

3,385,618
CERAMIC-TO-METAL SEAL
Billy M. Hargis, Cleveland, Tenn., assignor to American Lava Corporation, Chattanooga, Tenn., a corporation of Tennessee
Filed May 26, 1965, Ser. No. 459,014
4 Claims. (Cl. 287—189.365)

This invention relates to ceramic-to-metal seals and more particularly to hermetic seals between an apertured ceramic member and a metal member extending therethrough.

Conventionally metal pins or similar elements are bonded and sealed in apertures of ceramic elements by first metalizing the inner surface of the aperture, inserting the metal element into the aperture and soldering or brazing the element to the metalized surface. Using this method it is desirable to match as closely as possible the thermal expansion characteristics of the metal and ceramic elements in order to avoid fracturing the ceramic. Even so, a high percentage of rejects is produced. It has also been proposed to place shims or washers around the metal element, and solder or braze these shims or washers to the metal element and to a metalized area surounding the aperture. A disappointing number of rejects also result from this procedure because of the difficulty in uniformly sealing all of the edges of the shim or washer to the adjacent metal and metalized surfaces.

The teaching of the present invention provides a means whereby hermetic seals can be produced which are sufficiently flexible to allow for the expansion and contraction of the materials sealed together without fracturing the more brittle material. The seals of the present invention can be formed simultaneously in large quantities, for example, in multi-pin electronic applications, while producing a high percentage of successfully hermetically sealed elements. The seals of the present invention are formed without the need for shims, washers or shoulders on the metal element. The invention provides a means of forming durable hermetic seals between large diameter pins and correspondingly large apertures in ceramic elements.

The invention will be further explained with reference to the accompanying drawings, wherein.

Figure 1:
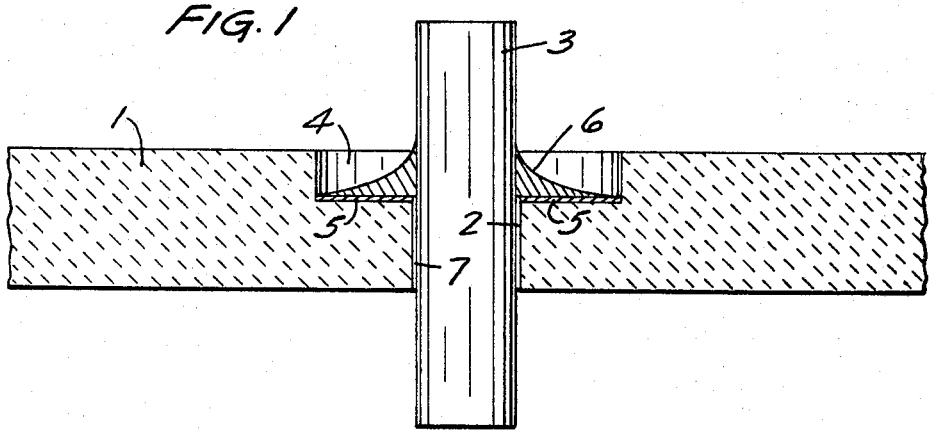
FIGURE 1 is a cross-sectional view of a seal of the present invention.

Referring more particularly to the drawings, there is seen in FIGURE 1 a ceramic member 1 having an aperture 2 therethrough. A metal member 3 having a diameter slightly less than that of the aperture 2 passes through the aperture. A counterbored area 4 is formed around the aperture on one side of the ceramic member. A metalized area 5 is formed at least on the bottom surface of the counterbore. The hermetic seal is formed by a fillet of soldering or brazing metal 6 of a type hereinafter specified which completely encircles the metal member 3 and is fused to the outer periphery thereof immediately adjacent but outside the aperture as well as to the metalized surface 5. A slight clearance 7 is provided between the major portion of the inner surface of the aperture and the periphery of the metal element. This clearance allows for the useful joining of materials having different coefficients of thermal expansion. It is seen that any forces applied to the ceramic element as a result of thermal changes will be shear stresses in the vicinity of the metalized portion 5. The fillet 6 is of such shape and composition that considerable flexing is possible during expansion and contraction without fracturing the ceramic member or destroying the hermetic character of the seal.

Figure 2:
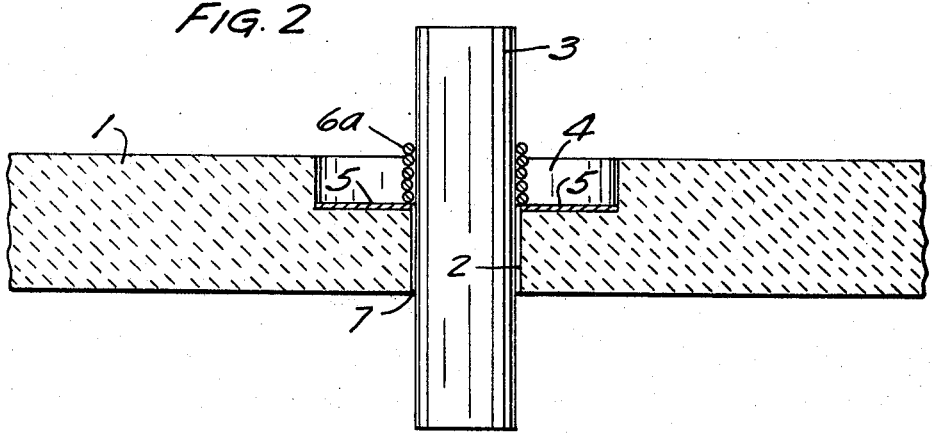
FIGURE 2 is a cross-sectional view of an apertured ceramic element and a metal element preparatory to forming a seal of the present invention.

In FIGURE 2 are shown the same members depicted in FIGURE 1 just prior to the formation of the hermetic seal between ceramic member 1 and metal member 3. In accordance with the preferred method of forming the seal, the members are assembled as desired and a coil of solder or brazing material 6A is positioned around the metal member 3 in contact with the metalized surface 5. Supports, not shown, such as will be familiar to those skilled in the art, are used to support the ceramic member 1 and metal member 3 in the desired relationship relative to each other prior to bonding. The assembly is placed in a kiln and fired to a temperature above the melting point of the solder or brazing material to cause the same to flow into a meniscus shaped fillet. Upon cooling the fillet solidifies to hermetically seal the parts. It will be apparent that this method is easily adaptable to the formation of ceramic members such as connectors and pin sockets having a plurality of metal elements passing therethrough.

Various departures from the preferred embodiment shown in the drawings can be made. For example, the counterbore 4 can be omitted and instead a ceramic having both surfaces flat and continuous can be used. While the preferred shape of the metal element and the aperture is circular, the invention can be applied to other configurations such as square or elliptical apertures and metal members. While it is prefered that the space 7 be provided in the case of members having greatly differing coefficients of thermal expansion, it has been found that in many cases, particularly in the case of pins having a diameter of less than about 2 mm., the inner surface of the aperture may also be metalized and the seal will then be effected around the entire inner surface of the aperture in addition to the meniscus shaped fillet around the upper portion of the aperture. In such cases slight cracks may occur in the ceramic without impairing the strength or hermetic character of the seal because the fillet of ductile metal over the face of the ceramic surrounding the aperture effectively seals off minor cracks or imperfections.

Figure 3:
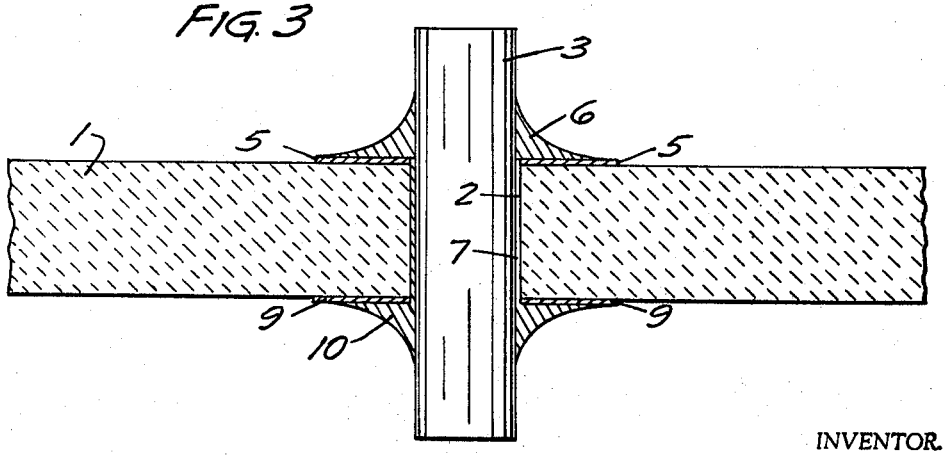
FIGURE 3 is a cross-sectional view of a seal formed in accordance with a further embodiment of the invention.

A very desirable type of seal is formed by providing a meniscus shaped fillet at each end of the aperture as shown in the embodiment of FIGURE 3. Such a seal provides considerably greater rigidity to the final construction. This construction is useful in forming assemblies which may be subjected to significant stresses due to the application thereto of bending, torsional, tensile or compressive forces. This embodiment can be formed using a single firing step by providing a metalized flow path for the solder or brazing material on the inner surface of the aperture. A metalized area 9 is provided on the bottom face of the ceramic around the aperture. A slightly larger coil of the solder or brazing material, i.e., one having more coils, is then placed around the metal element 3 and the same, after melting, flows under the force of gravity, by capillary attraction, and by surface wetting along the metalized path within the aperture to form a fillet 10 on the underside in addition to fillet 6 on the top side of the ceramic surrounding the aperture, as shown in FIGURE 3.

In order to form a hermetic seal it is necessary that the metal member occupy most of the area of the aperture in the ceramic member adjacent the end surrounded by the metalized pattern. In the case of round pins and round apertures, generally used in the electronic art, the difference between the size of the diameter of the aperture and the diameter of the metal member should preferably be no more than about 0.75 mm. at brazing temperature to consistently form hermetically tight seals when the members are fired together with the solder or braze material. The preferred embodiment of the invention thus provides a construction wherein a hairline clearance is provided between the elements which allows for expansion and contraction thereof in response to thermal changes without breaking the seal or cracking the ceramic element.

The invention is of particular utility in forming multi-pin electronic assemblies. For example, electronic connectors having as many as 50 pins passing therethrough have been formed in accordance with the present invention with high yields, approaching 100%, of hermetically sealed connections. Pins exceeding 3.5 cm. in diameter have been successfully sealed to ceramic pieces having apertures sufficiently larger than the pins to be sealed therein to provide a hairline clearance between the pins and the apertures. The flexing of the ductile fillet seal permits the use of such large diameter pin assemblies, heretofore regarded as unfeasible to construct, under widely varying temperature conditions.

The ceramic element 1 will generally be an insulator having a resistivity at room temperature above $10^9$ ohm cm. The metal element will generally be an electric conductor with a resistivity below $10^{-2}$ ohm cm. at room temperature. To provide parts having maximum strength it is preferred to form the ceramic element from a composition containing at least 90% alumina. Such compositions are found to be receptive to metalizing and heat stable in the temperatures normally encountered in the metalizing and firing steps of the process as well as under the conditions normally encountered in use of the final product. Other ceramic compositions suitable in the practice of the invention are steatite, fosterite and beryllia. The metal elements can be formed from a variety of metals such as copper, nickel, stainless steel or the like.

The metalized pattern 5 may be applied in a number of ways as will be apparent to those skilled in the art. These methods include silk screening, brush painting or spraying through a mask the desired pattern; metalizing the entire part by solution metalizing, dipping, or spraying and either grinding away the metal coating from all except the desired areas or etching away the metal except from the desired areas, for example, by applying a photosensitive etch-resistant composition over the metal coating, exposing the desired areas to light, hardening the coating on the desired areas and etching away the metal except at the portions protected by the photo-activated etch-resistant composition.

In order to form reliable hermetic seals the width of the metalized pattern should be at least 0.25 mm. It is preferred that the metalized surface be approximately perpendicular to the aperture in order that the forces on the ceramic element will cause shear stresses rather than tensile stresses because of the much greater strength of ceramic in shear than in tension. It will be understood, however, that the results of the present invention can be substantially achieved by countersinking the top of the ceramic a few degrees. The preferred compoistion for metalizing comprises molybdenum because of the ease with which a uniform adherent metalized area can be formed. Other suitable metalizing compositions include other active metals such as titanium, zirconium, and tungsten based compositions.

The following examples will serve to further illustrate the invention.

Example I

An annular shaped ceramic part was formed from 96% aluminum oxide. The part had an outer diameter of 13 mm., a length of 6 mm. and was provided with a 7 mm. diameter hole through the center. The metal member was a mild steel pin 19 mm. long by 6 mm. diameter. The ceramic piece was metalized in a circular pattern concentric to the hole in the ceramic with a mixture based on fine molybdenum and manganese powder. The metal powders were suspended in an organic vehicle and forced through a pattern on a screen by a squeegee. The metal paste was deposited on the ceramic in a pattern providing a 1¼ mm. wide strip encircling the hole. The ceramic pieces was heated to 1500° C. in a reducing atmosphere to sinter the metal particles into an adherent coating on the ceramic. The metalized pattern was then electroplated with nickel to improve braze wetting. The pin was cleaned and placed through the hole in the ceramic. A coil formed from six turns of silver braze wire having a diameter of 0.5 mm. formed by winding the braze wire around a 6 mm. diameter mandrel, was placed over the metal pin, and in contact with the metalized pattern on the ceramic. The assembly was heated in a reducing atmosphere above the melting point of the silver (960° C.) using the following firing cycle:

Heated slowly to 900° C.
5 minute heat soak at 900° C.
Heated slowly to 1000° C.
Cooled slowly in reducing atmosphere.

The coil of silver braze material melted, wetted the metal pin and the metalized surface on the ceramic, and assumed the shape of a fillet between the top of the ceramic and the metal pin. On cooling the fillet solidified to form a hermetic seal between the metal and ceramic members.

Example II

A 3 mm. thick circular ceramic disc having a diameter of 19 mm. and having seven 1½ mm. diameter holes was formed from a ceramic composition comprising 94% alumina. A 3 mm. diameter counterbore 0.5 mm. deep was formed around each of the holes. Seven pins having a diameter of 1.5 mm. and a length of 16 mm. were used as the metal elements. The ceramic disc was metalized by dipping in an aqueous solution containing a soluble salt of lithium hydroxide and molybdic acid. The coated discs were dried and fired in a reducing atmosphere to about 1400° C. During this firing the metalizing salt melted, coated the ceramic, and was reduced to lithium and molybdenum metal bonded to the ceramic. The entire surface of the ceramic was metalized by this procedure and was then electroplated with a layer of copper approximately $\frac{1}{80}$ mm. thick. The electroplated part was sintered at 1000° C. for 30 minutes in a reducing atmosphere. After cooling the two flat faces of the disc were ground to remove the unwanted metalizing. A metal coating remained only on the counterbores, the pin holes and the outer diameter of the disc. Brazing material was prepared by winding high purity copper wire having a diameter of 0.5 mm. around a 1.5 mm. mandrel. Three turns of the braze coil were placed around each pin in contact with the metalized surface of the counterbore. The assembly was fired in a hydrogen tube kiln. The part was preheated at 700° C. for 3 minutes, pushed into a 1120° C. hot zone for a 2-minute heat soak and then pulled out of the hot zone into a 100° C. zone in 10 seconds. After cooling below 200° C. the part was removed from the furnace. Each pin was hermetically sealed to the ceramic by a fillet of copper encircling the pin.

What is claimed is:
1. An article comprising:
 (a) a ceramic member having a circular aperture therein;
 (b) a circular metal member having a diameter slightly less than the diameter of said aperture extending into said aperture;
 (c) a metalized area encircling said aperture on a surface of said ceramic member approximtely perpendicular to the axis of said aperture;
 (d) a meniscus shaped fillet of metal joining and hermetically sealing the periphery of said metal member to said metalized area.
2. The article of claim 1 wherein the area around said aperture is counterbored and said metalized area comprises the bottom surface of said counterbore.

3. A sealed connection between an apertured ceramic member and a metal member extending into said aperture which comprises:
   (a) a metalized area encircling said aperture on a surface of said ceramic member approximately perpendicular to the axis of said aperture;
   (b) a meniscus shaped fillet of metal joining and hermetically sealing the periphery of said metal member to said metalized area;
   (c) a hairline clearance between the major portion of the inwardly facing surface of said aperture and the periphery of said metal member sufficient to allow said metal member to expand and contract at a different rate than said ceramic member without fracturing said ceramic member during changes in the ambient temperature.

4. A sealed connection between an apertured alumina member and a metal member extending into said aperture which comprises:
   (a) a molybdenum coated area at least 0.25 mm. wide encircling said aperture on a surface of said alumina member substantially perpendicular to the axis of said aperture;
   (b) a meniscus shaped fillet of ductile metal joining and hermetically sealing the periphery of said metal member to said molybdenum coated area;
   (c) clearance between the inwardly facing surface of said aperture and the periphery of said metal member of up to 0.75 mm. at brazing temperature.

References Cited
FOREIGN PATENTS 903,824   8/1962   Great Britain.

ROBERT F. BURNETT, *Primary Examiner.*

W. J. VAN BALEN, *Assistant Examiner.*